(12) United States Patent
Eklund et al.

(10) Patent No.: US 8,683,932 B2
(45) Date of Patent: Apr. 1, 2014

(54) POSITIONING OF STITCH DATA OBJECTS

(75) Inventors: Henrik Eklund, Tenhult (SE); Christian Bondesson, Huskvarna (SE)

(73) Assignee: VSM Group AB (SE)

( * ) Notice: Subject to any disclaimer, the term of this patent is extended or adjusted under 35 U.S.C. 154(b) by 745 days.

(21) Appl. No.: 12/675,518

(22) PCT Filed: May 23, 2008

(86) PCT No.: PCT/SE2008/050609
§ 371 (c)(1),
(2), (4) Date: Jul. 22, 2010

(87) PCT Pub. No.: WO2009/029019
PCT Pub. Date: Mar. 5, 2009

(65) Prior Publication Data
US 2011/0041746 A1 Feb. 24, 2011

Related U.S. Application Data

(60) Provisional application No. 60/935,781, filed on Aug. 30, 2007.

(51) Int. Cl.
*D05C 5/02* (2006.01)
(52) U.S. Cl.
USPC ........................................ 112/475.19
(58) Field of Classification Search
USPC ..................... 112/475.18, 475.19, 102.5, 112/470.01–470.06; 700/136, 137, 138
See application file for complete search history.

(56) References Cited

U.S. PATENT DOCUMENTS

| | | | |
|---|---|---|---|
| 3,570,426 A | 3/1971 | Kunes | |
| 3,585,950 A | 6/1971 | Ito | |
| 3,613,608 A | 10/1971 | Hinerfeld et al. | |
| 3,613,610 A | 10/1971 | Hinerfeld et al. | |
| 3,693,561 A | 9/1972 | Hrinko, Jr. et al. | |
| 3,712,254 A | 1/1973 | Beamish et al. | |
| 3,727,567 A | 4/1973 | Beazley | |
| 3,799,087 A | 3/1974 | Beamish et al. | |
| 3,815,531 A | 6/1974 | Wurst et al. | |
| 3,818,849 A | 6/1974 | Maddox, Jr. | |

(Continued)

FOREIGN PATENT DOCUMENTS

| CA | 1081544 A1 | 7/1980 |
|---|---|---|
| CA | 2515406 A1 | 8/2004 |

(Continued)

*Primary Examiner* — Tejash Patel
(74) *Attorney, Agent, or Firm* — Lando & Anastasi, LLP

(57) ABSTRACT

A method is provided for embroidering embroidery elements by means of a processor-controlled sewing machine (1). The method includes: the fabric (2) that is to be embroidered is placed in the required position in relation to a threaded needle (5) on the sewing machine; a plurality of embroidery elements (A, B, C) in the form of software products having pre-programmed embroideries are provided; a group of said embroidery elements, defined as stitch data objects in a memory (M), is selected; an arbitrary curve (KU) along which said group of embroidery elements (A, B, C) shall be embroidered on said fabric (2) is defined by the operator of the sewing machine; said embroidery elements of said group are distributed in a spaced relationship along said curve utilizing a positioning algorithm. According to the method of the invention, a coupling between the embroidery elements of the group and the arbitrary curve is preserved during the full processing by said positioning algorithm.

15 Claims, 14 Drawing Sheets

(56) References Cited

U.S. PATENT DOCUMENTS

| | | |
|---|---|---|
| 3,904,890 A | 9/1975 | Wenrich et al. |
| 3,967,566 A | 7/1976 | Spiegel et al. |
| 4,051,794 A | 10/1977 | Herzer et al. |
| 4,073,247 A | 2/1978 | Cunningham et al. |
| 4,092,937 A | 6/1978 | Landau, Jr. et al. |
| 4,100,865 A | 7/1978 | Landau, Jr. et al. |
| 4,104,976 A | 8/1978 | Landau, Jr. et al. |
| 4,108,090 A | 8/1978 | Landau, Jr. et al. |
| 4,116,145 A | 9/1978 | Nicolay |
| 4,133,275 A | 1/1979 | Herzer et al. |
| 4,154,179 A | 5/1979 | Arnold |
| 4,160,422 A | 7/1979 | Barber et al. |
| 4,181,085 A | 1/1980 | Conner, Jr. |
| 4,185,575 A | 1/1980 | Brown et al. |
| 4,195,582 A | 4/1980 | Novick et al. |
| 4,214,540 A | 7/1980 | Cook |
| 4,221,176 A | 9/1980 | Besore et al. |
| 4,351,254 A | 9/1982 | Brown |
| 4,352,334 A * | 10/1982 | Childs et al. ............ 112/475.19 |
| 4,359,008 A | 11/1982 | Newman |
| 4,365,565 A | 12/1982 | Kawai et al. |
| 4,373,458 A | 2/1983 | Dorosz et al. |
| 4,373,459 A | 2/1983 | Dunn et al. |
| 4,391,215 A | 7/1983 | Sansone |
| 4,393,343 A | 7/1983 | Angersbach et al. |
| 4,412,498 A | 11/1983 | Scholl |
| 4,444,135 A * | 4/1984 | Yanagi et al. ........... 112/470.04 |
| 4,457,246 A | 7/1984 | Hanyu et al. |
| 4,503,794 A | 3/1985 | Ishihara et al. |
| 4,507,596 A | 3/1985 | Angersbach et al. |
| 4,509,443 A | 4/1985 | Martell et al. |
| 4,513,676 A | 4/1985 | Martell et al. |
| 4,519,331 A | 5/1985 | Kosrow et al. |
| 4,526,114 A | 7/1985 | Martell et al. |
| 4,526,116 A | 7/1985 | Männel |
| 4,555,997 A | 12/1985 | Tancs |
| 4,563,964 A | 1/1986 | Sjodin |
| 4,622,907 A * | 11/1986 | Kimura ..................... 112/102.5 |
| 4,648,337 A | 3/1987 | Mall |
| 4,682,554 A | 7/1987 | Goto et al. |
| 4,686,917 A | 8/1987 | Braun |
| 4,706,584 A | 11/1987 | Senda et al. |
| 4,726,307 A | 2/1988 | Yamauchi |
| 4,726,309 A | 2/1988 | Popp |
| 4,742,786 A * | 5/1988 | Hashimoto et al. ........ 112/102.5 |
| 4,748,920 A | 6/1988 | Stutznacker |
| 4,757,773 A | 7/1988 | Nomura et al. |
| 4,781,130 A * | 11/1988 | Badowski ................. 112/470.04 |
| 4,794,875 A | 1/1989 | Noguchi et al. |
| 4,803,937 A | 2/1989 | Hiramatsu et al. |
| 4,815,406 A | 3/1989 | Brown et al. |
| 4,834,008 A | 5/1989 | Sadeh et al. |
| 4,849,902 A | 7/1989 | Yokoe et al. |
| 4,860,678 A | 8/1989 | Skogward |
| 4,867,082 A | 9/1989 | Sabbioni et al. |
| 4,867,087 A | 9/1989 | Suzuki et al. |
| 4,932,343 A | 6/1990 | Mardix et al. |
| 4,982,677 A | 1/1991 | Nomura et al. |
| 4,995,328 A | 2/1991 | Tanaka |
| 5,000,105 A | 3/1991 | Tanaka |
| 5,012,752 A | 5/1991 | Murata et al. |
| 5,018,466 A | 5/1991 | Hasegawa |
| 5,095,835 A | 3/1992 | Jernigan et al. |
| 5,138,962 A | 8/1992 | Klundt |
| 5,146,862 A | 9/1992 | Sato et al. |
| 5,156,106 A | 10/1992 | Suzuki et al. |
| 5,156,107 A | 10/1992 | Kyuno et al. |
| 5,184,560 A | 2/1993 | Asano |
| 5,270,939 A | 12/1993 | Goldberg et al. |
| 5,303,665 A | 4/1994 | Hausammann |
| 5,319,565 A | 6/1994 | Hausammann et al. |
| 5,323,722 A | 6/1994 | Goto et al. |
| 5,347,940 A | 9/1994 | Hori et al. |
| 5,389,868 A | 2/1995 | Mikami et al. |
| 5,410,976 A | 5/1995 | Matsubara |
| 5,474,005 A | 12/1995 | Yamauchi et al. |
| 5,477,795 A | 12/1995 | Nakayama et al. |
| 5,537,939 A | 7/1996 | Horton |
| 5,537,946 A | 7/1996 | Sadeh et al. |
| 5,562,059 A | 10/1996 | Yamauchi et al. |
| 5,571,240 A | 11/1996 | Yamauchi et al. |
| 5,588,383 A | 12/1996 | Davis et al. |
| 5,592,891 A | 1/1997 | Muto |
| 5,603,272 A | 2/1997 | Takahashi et al. |
| 5,653,186 A | 8/1997 | Yamauchi et al. |
| 5,701,830 A | 12/1997 | Muto |
| 5,740,055 A | 4/1998 | Iwata |
| 5,755,240 A | 5/1998 | Schonborn |
| 5,791,270 A | 8/1998 | Mori |
| 5,911,182 A | 6/1999 | Uyama et al. |
| 5,924,372 A | 7/1999 | Okuda et al. |
| 5,974,997 A | 11/1999 | Amburgey |
| 6,032,595 A | 3/2000 | Okuyama |
| 6,131,526 A | 10/2000 | Iida et al. |
| 6,135,038 A | 10/2000 | Okamoto |
| 6,189,989 B1 | 2/2001 | Hirabayashi et al. |
| 6,209,468 B1 | 4/2001 | Marcangelo et al. |
| 6,293,210 B1 | 9/2001 | Freeman et al. |
| 6,321,670 B1 | 11/2001 | Tomita et al. |
| 6,381,818 B1 | 5/2002 | Freeman et al. |
| 6,718,895 B1 | 4/2004 | Fortuna |
| 6,729,255 B2 | 5/2004 | Ton et al. |
| 6,732,668 B2 | 5/2004 | Zesch et al. |
| 6,823,807 B2 | 11/2004 | Zesch et al. |
| 6,871,605 B1 | 3/2005 | Zesch et al. |
| 6,883,446 B2 | 4/2005 | Koerner |
| 6,883,449 B2 | 4/2005 | Burrell et al. |
| 6,963,790 B2 | 11/2005 | Mizuno et al. |
| 6,983,192 B2 | 1/2006 | Block et al. |
| 7,210,417 B2 | 5/2007 | Koerner |
| 7,212,880 B2 | 5/2007 | Mizuno et |
| 7,240,628 B2 | 7/2007 | Friman et al. |
| 7,308,333 B2 | 12/2007 | Kern et al. |
| 7,386,361 B2 * | 6/2008 | Nobuyuki et al. ............ 700/138 |
| 7,412,936 B2 | 8/2008 | Price et al. |
| 7,460,925 B2 | 12/2008 | Noguchi |
| 7,793,602 B2 | 9/2010 | Koemer |
| 7,814,832 B2 | 10/2010 | Franz |
| 8,261,679 B2 | 9/2012 | Ihira et al. |
| 8,387,547 B2 | 3/2013 | Bardh et al. |
| 2002/0043202 A1 | 4/2002 | Freeman et al. |
| 2003/0140829 A1 | 7/2003 | Zesch et al. |
| 2003/0140831 A1 | 7/2003 | Zesch et al. |
| 2003/0140832 A1 | 7/2003 | Ton et al. |
| 2004/0210336 A1 | 10/2004 | Block et al. |
| 2005/0016428 A1 | 1/2005 | Koerner |
| 2006/0064195 A1 | 3/2006 | Kern et al. |
| 2006/0213413 A1 | 9/2006 | Koerner |
| 2007/0204781 A1 | 9/2007 | Noguchi |
| 2007/0245940 A1 | 10/2007 | Wahlstrom |
| 2007/0256619 A1 | 11/2007 | Koemer |
| 2010/0224111 A1 | 9/2010 | Ihira et al. |
| 2011/0005441 A1 | 1/2011 | Roche |
| 2011/0146553 A1 | 6/2011 | Wilhelmsson et al. |
| 2011/0168070 A1 | 7/2011 | Lanquist |
| 2011/0303138 A1 | 12/2011 | Flygare et al. |
| 2012/0060733 A1 | 3/2012 | Maki et al. |
| 2012/0060734 A1 | 3/2012 | Yamanashi et al. |
| 2012/0234222 A1 | 9/2012 | Naka |
| 2013/0014682 A1 | 1/2013 | Brindzik |
| 2013/0042797 A1 | 2/2013 | Bondesson et al. |

FOREIGN PATENT DOCUMENTS

| | | |
|---|---|---|
| DE | 102007001073 A1 | 8/2007 |
| EP | 77788 A1 | 5/1983 |
| EP | 103364 A2 | 3/1984 |
| EP | 117713 A1 | 9/1984 |
| EP | 124211 A1 | 11/1984 |
| EP | 366140 A1 | 5/1990 |
| EP | 515131 A1 | 11/1992 |
| EP | 564771 A2 | 10/1993 |
| EP | 857228 A1 | 8/1998 |
| EP | 1184502 A1 | 3/2002 |

(56) References Cited

FOREIGN PATENT DOCUMENTS

| | | |
|---|---|---|
| EP | 1777331 A1 | 4/2007 |
| EP | 2226419 A1 | 9/2010 |
| GB | 1320764 A | 6/1973 |
| GB | 1349994 A | 4/1974 |
| GB | 1375540 A | 11/1974 |
| GB | 1393294 A | 5/1975 |
| GB | 1440350 A | 6/1976 |
| GB | 1475791 A | 6/1977 |
| GB | 1526209 A | 9/1978 |
| GB | 1547931 A | 7/1979 |
| GB | 1547932 A | 7/1979 |
| GB | 1547933 A | 7/1979 |
| GB | 1547934 A | 7/1979 |
| GB | 1568486 A | 5/1980 |
| GB | 1570241 A | 6/1980 |
| GB | 1570242 A | 6/1980 |
| GB | 1570243 A | 6/1980 |
| GB | 1570244 A | 6/1980 |
| GB | 1570245 A | 6/1980 |
| GB | 1571736 A | 7/1980 |
| GB | 2043124 A | 10/1980 |
| GB | 1583629 A | 1/1981 |
| GB | 2157723 A | 10/1985 |
| GB | 2168085 A | 6/1986 |
| GB | 2177520 A | 1/1987 |
| GB | 2204604 A | 11/1988 |
| JP | 1212591 A | 8/1989 |
| JP | 6304359 A | 11/1994 |
| JP | 2000167277 A | 6/2000 |
| JP | 2000342869 A | 12/2000 |
| JP | 2009011594 A | 1/2009 |
| JP | 2009233435 A | 10/2009 |
| JP | 2010185151 A | 8/2010 |
| KR | 198800714 B1 | 4/1988 |
| WO | 8901067 A1 | 2/1989 |
| WO | 9715708 A1 | 5/1997 |
| WO | 0104405 A1 | 1/2001 |
| WO | 2004072349 A2 | 8/2004 |
| WO | 2006071786 A2 | 7/2006 |
| WO | 2007143062 A2 | 12/2007 |
| WO | 2010144013 A1 | 12/2010 |

* cited by examiner

POSITIONING OF STITCH DATA OBJECTS

TECHNICAL FIELD

The present invention relates to a method of positioning embroidery elements in a spaced relationship along a curve on sewing with a processor-controlled sewing machine on a fabric. The invention further relates to a computer program product coded with an algorithm for performing said method.

TECHNICAL BACKGROUND

In embroidering a fabric using the technology currently available it is possible to use ready designed embroidery elements which are stored in a memory, either in the sewing machine or an external memory unit. Such embroidery elements can be combined and programmed to succeed one another in order to generate a desired pattern. Examples of the combination of embroidery elements are given in the document U.S. Pat. No. 4,352,334, which discloses a method of combining embroidery elements, in this case embroidered letters, so that these follow a predefined curve. By specifying certain data, such as the radius of the curve, for example, the machine then embroiders a sequence of embroidery elements along the predefined curve, in which the embroidery elements are slanted in relation to one another in order to follow the curve described. The information for the sewing machine memory on the reciprocal relationship of the embroidery elements is in this case supplied externally by user-input and is not derived from data associated with the embroidery elements themselves. Another document U.S. Pat. No. 6,202,001 describes a method of storing data on a sewing pattern in embroidery blocks, which recur cyclically in a sequence so as to produce a desired embroidery pattern.

Advanced embroidery sewing machines provide tools for creating new designs by combining existing designs and/or patterns forming embroidery elements. Said embroidery elements, herein also called Stitch Data Objects and abbreviated SDO, contain stitch data for e.g. a pattern, a pattern sequence, a design, an embroidery character or a sew character. The SDOs may be freely combined by an operator or by a machine controlled algorithm. The machine controlled algorithm may as an example position the SDOs on a circle or a sine curve. When using prior art algorithms for positioning the SDOs on an arbitrary curve for providing more advanced shapes of embroideries, there are drawbacks, which will be pointed out along with the description of the present invention.

SUMMARY OF THE INVENTION

According to one aspect of the present invention a method is provided for embroidering embroidery elements by means of a processor-controlled sewing machine. The method includes: the fabric that is to be embroidered is placed in the required position in relation to a threaded needle on the sewing machine, a plurality of embroidery elements in the form of software products having pre-programmed embroideries are provided, a group of said embroidery elements, defined as stitch data objects, in a memory is selected, an arbitrary curve along which said group of embroidery elements shall be embroidered on said fabric is defined by the operator of the sewing machine, said embroidery elements of said group are distributed in a spaced relationship along said curve utilizing a positioning algorithm. According to the method of the invention, a coupling between the embroidery elements of the group and the arbitrary curve is preserved during the full processing by said positioning algorithm, as will be further discussed below, In an additional option of the aspect of the invention the position of at least one of said embroidery elements is selectively adjusted in relation to any one of: a neighboring embroidery element of said group, the arbitrary defined curve.

The embroidery elements are stored as data files, SDOs, on any desired storage medium, each separate embroidery element comprising data with information on each individual stitch in an embroidery that is to be performed by the sewing machine in order to create a physical embroidery element from the data relating to the embroidery of the physical embroidery element. This means that a corresponding data file, here simply referred to as the embroidery element (SDO), can be linked to each physical embroidery element that can be embroidered by the sewing machine.

Data for each individual embroidery element can be reproduced as a graphic representation of the embroidery element including the outlines thereof and includes graphic representation of its embroidery on a display, which may be integrated with the sewing machine. On the display any desired embroidery element can be retrieved from the storage medium and shown on the display as a graphic representation of the embroidery element. For the sake of simplicity, each such graphic representation of an embroidery element is here referred to as a graphics module. By freely selecting graphics modules and joining a number of these together in a group to form a sequence along a curve on the display using the graphic representations, a shape for the desired embroidery is created from the embroidery elements. The sequence of selected graphics modules is stored in a memory as a selected group of embroidery elements.

Said aspect of the invention is characterized according to the steps of method claim 1.

According to a second aspect of the invention a computer program product is characterized according to the characterizing part of the independent computer program product claim.

Further aspects of the invention are presented in the dependent claims.

The method described in this specification is used for distributing a group of embroidery elements to form a desired shape. This distribution effort for creating the desired shape is referred to as shaping. Said shaping is performed as previously stated by utilizing a positioning algorithm. A fundamental shaping algorithm is described in the description of embodiments below. In the description of the embodiments it is described, apart from shaping groups of embroidery elements, also how embroidery elements of a group are individually positioned. A shape (the desired pattern built by the group of embroidery elements) is herein referred to as GCP (Group common positioning algorithm). General sewing machine terminology is also described in the embodiments.

In brief, it is here in the summary described a user interface explaining the shaping functionality of a sewing machine, wherein the functionality is included. The list below explains how the shaping function works, i.e. the steps performed when the user wants to create a shaped design combination.

1. The user selects one or a number of existing SDOs that shall be positioned by the shaping algorithm.
2. The user selects a shape, i.e. a curve of a specific shape that shall be used to calculate the angle and position of the SDOs. The shape may be either a predefined shape included in the sewing machine software or a shape created by the user.

3. For each shape, there are a number of pre-defined sets of control points. Each set of control points includes at least one of the curve definition points that define the curve. When an appropriate set of control points has been selected, the user may modify the curve by translating, rotating or scaling the set. Naturally, new sets of control points may also be created by the user. It should be emphasized here that a set of control point is a subset of the curve definition points. Modifying the curve can be made, e.g., by means of adding or removing a control point from a said defined set of control points, or by means of adding or removing a curve definition point to/from said set curve.

In addition to the curve modification achieved by moving the control points, it is possible to change the curve by adjusting the "attraction", i.e. a weight of each curve definition point defined in relation to the curve. Depending on the curve definition point weight the curve passes closer to or more far from the control point. Curve definition points can be added or removed from the curve. It is also possible to add or remove additional control points.

4. The SDOs may be distributed along the curve in different ways. Either the SDOs are evenly distributed along the full length of the curve or, alternatively, an SDO can be adjusted to the right or to the left along the curve. If the SDOs are right or left adjusted, the user can set the gap between the SDOs, see further in the description of embodiments.

5. The angle for each SDO is normally set by the SDO positioning algorithm. However, it is also possible to change the angle of the SDOs manually in a GCP. The angle may be set according to one of the algorithms described in the embodiments. Other ways of setting the angle may be:

5.1. The user specifies the angle for each SDO individually.
   5.2 All SDOs are aligned to a specific coordinate system, e.g. the DC coordinate system in FIG. 2.

The angle control algorithm described in [13] may also be used to control the scale of the SDOs.

6. As will be discussed below in detail the SDOs are normally positioned so that one side of a rectangle enclosing the SDO is touching the curve. However, in some cases it may be preferable to align the SDOs to another parts of the SDOs, e.g. the centre point of the enclosing rectangle. The point of alignment of the SDO may be specified by the user.

Advantages Obtained by Use of the Invention are Listed as A to F

A) GCP Fundamentals.

Some prior art sewing machines and embroidery software PC programs can define a curve and position of a number of SDOs along the curve. When the curve and the SDOs have been defined, the curve and the position of the SDOs are calculated according to some algorithm. When the position of the SDOs has been set, the SDOs are given positions in the main coordinate system (FIG. 2) without any relation to the curve. After this, the curve definition points and the curve are deleted. This makes it impossible to edit the shape of the curve or to add or remove SDOs afterwards.

According to the embodiments of the present invention the positions and angles of the SDOs shall be controlled by the curve both when the GCP is created as well as when it is edited. This is previously referred to as a preservation of a coupling between the embroidery elements (SDOs) of the group and the curve. This implies that a number of advantageous measures may be listed, such as it is possible to:

add and/or delete SDOs to and/or from the GCP,
   change the shape of the curve by moving the control points and/or change the weights of the control points,
   insert and/or remove curve definition points,
   create a user defined set of control points,
   select a new predefined set of control points,
   rotate, scale and/or mirror the GCP,
   set the SDO angle(s),
   change the point of alignment according to point 7 in the listing of available steps above,
   change the way the SDOs are distributed along the curve according to point 5 in the listing above in an arbitrary order.

A very advantageous option according to the aspects of the present invention is that the listed measures may be performed in an arbitrary order, an option which is not available on prior art sewing machines. One reason for this is that the coupling between the SDOs and the curve of the GCP is all the time preserved. From this it is possible to achieve a functionality, wherein, e.g., a number of SDOs distributed along a curve in the shape of a star automatically by the sewing machine can instead be distributed along a curve having the shape of a circle. That is, the positioning of the SDOs of a GCP may be converted in dependence of selected pre-defined curves.

Optionally the GCP may also be saved on file in such a way that it is possible to regenerate the GCP original behaviour when the GCP is loaded in the machine again.

The described method implies that more advanced curve forms than in the existing solutions can be created. The possibility to be able to edit the GCP in different ways after it has been created is also a great advantage compared to the existing solutions.

B) Manipulation of the Curve and its Control Points.

The curve may be defined arbitrarily by the user by a positioning of the curve definition points and a setting of the weights of a curve definition point. An alternative way of creating a curve is to let a user choose a curve (shape) from a number of predefined shapes as described above. The predefined shape may define a straight line, a circle, a star or the like. After the curve has been created it is possible to edit the curve definition points according to step 3 in the list of steps above.

The creation of a curve as described above, when the user chooses from a number of predefined "template" shapes facilitates the creation of complex shapes. The sets of edit control points make it easy to change and manipulate advance curve forms.

C) Control of the Shaped Curve by Curve Definition Point Weights.

The curve is defined by a number of curve definition points. The position of each curve point is calculated from the position of the curve definition points using e.g. NURB curves (See, for example: http://en.Wikipedia.org/wiki/Nonuniform_rational_B-spline, version dated: Jul. 3, 2008). By controlling the weights according to point 3 in the list of steps above the appearance of the curve can be changed considerably, despite the fact that the user operation is simple and easy to understand. Use of the technique described allows for more advanced curves than compared to curves of prior art systems.

D) Spacing Methods.

The SDOs may be distributed in different ways, see further in step 4 in the description above. This adds additional GCP editing possibilities.

E) Auto Adjustments to Sharp Points.

The positions of the SDOs along the curve are important in order to achieve a distinct view of the shape when the curve is not shown. The curve is not normally sewn on the fabric. The "auto adjustment to sharp points" algorithm described in the embodiments facilitates positioning of the SDOs so that the shape curve is easily imagined.

F) Compensation for Convex/Concave Curves.

Compensation for convex/concave portions of a curve implies that the SDOs are automatically correctly positioned even though the curve may bend in different directions. See further in embodiments and figures referred to therein.

To sum up, the described method makes it possible to create and edit groups of SDOs combined in arbitrary advanced curved forms in a way that is flexible and easy to understand for the user. Furthermore, the user may modify the properties of the GCP in an arbitrary order, without having to redo all the previous steps as in existing solutions.

EMBODIMENTS OF THE INVENTION

A number of embodiments of the invention are described below with reference to the attached drawings.

Figure 1:
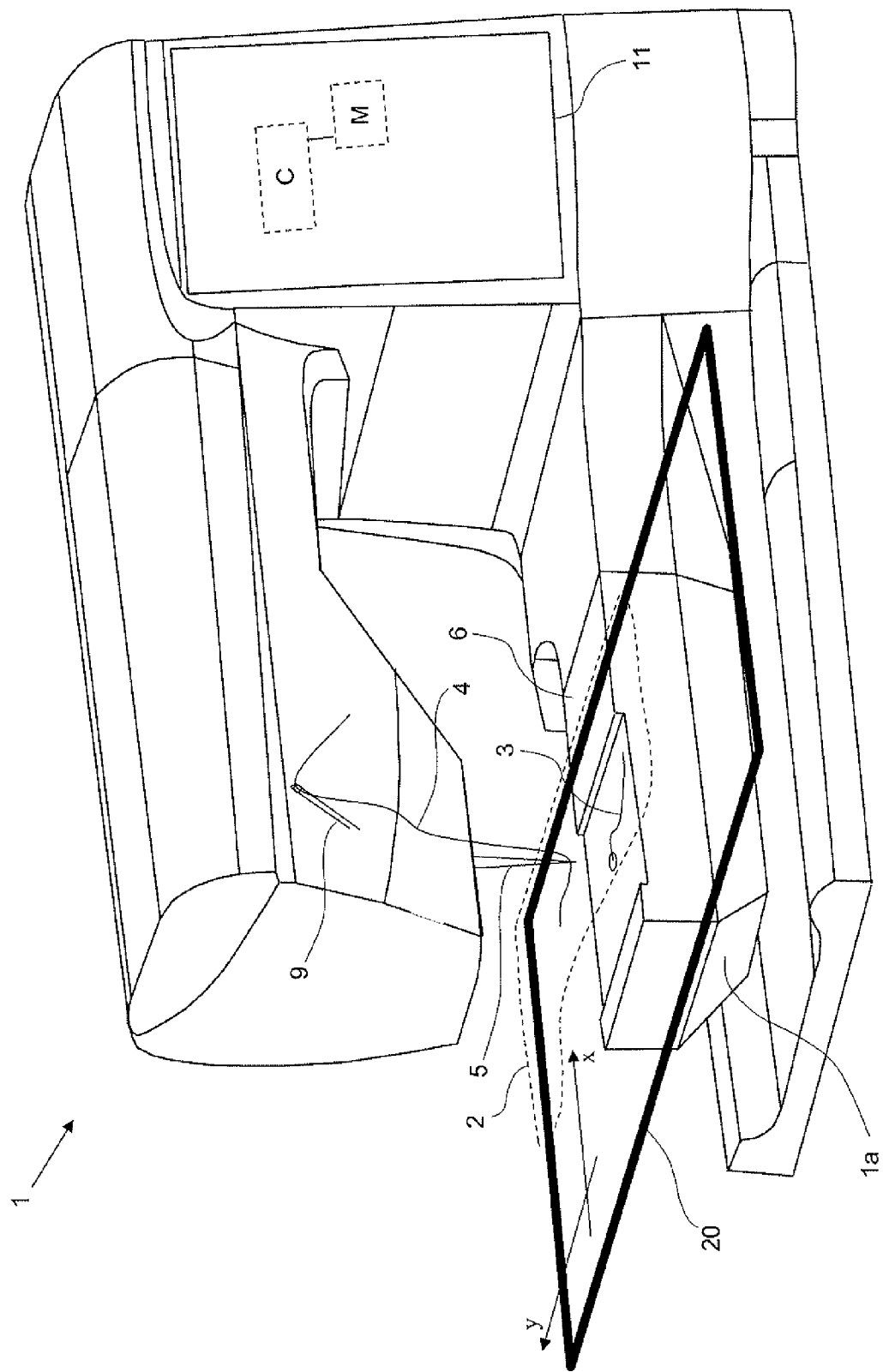
FIG. 1 schematically depicts an outline of a sewing machine having an embroidery frame mounted to it.

By way of example of the functioning of a lock stitch sewing machine for performing the inventive method, FIG. 1 depicts symbolically a sewing machine 1, where in a conventional manner a fabric 2 is fed forward between a bottom thread 3 and an upper thread 4 in order to execute a desired embroidery comprising stitches effected by means of a needle 5 which moves periodically through the fabric 2. In this example, the fabric 2 is moved across a sewing table 6, which also accommodates a horizontally disposed bottom thread bobbin intended for the bottom thread 3 and encased in a gripper in a lower arm 1a of the sewing machine. The sewing table 6 also has a stitchplate, over which the actual seam is executed. The upper thread 4 is led via a take-up lever 9, which by a cyclic up and down movement creates a loop of the upper thread 4 when the needle 5, through the eye of which the upper thread runs, has carried the upper thread through the fabric 2 and the take-up lever 9 reverses back upwards from its lowest position. A gripper tip hooks into the loop when the gripper rotates. To execute a stitch, in this case a lock stitch, the needle 5 performs reciprocating movement so that it leads the upper thread 4 down through the fabric 2, after which the gripper leads the upper thread 4 round the bobbin, which carries the bottom thread 3, resulting in a knot in the fabric 2 when the needle 5 moves up through the fabric and the take-up lever 9 tightens the knot in the fabric.

The machine is provided with a control program which, for example, is stored in a processor C. Further the sewing machine has an available memory M, preferably being accommodated in the machine, although the memory M as well may be external and accessible from the processor C. In the memory M the sewing machine embroidery elements for composing embroideries may be stored in the form of stitch data. A display 11 is provided, on which the images representing embroidery elements can be displayed to a user.

In FIG. 1 is also shown an embroidery frame arranged with the sewing machine. A piece of fabric 2 is stretched in the embroidery frame 20. The piece of fabric 2 is only symbolically shown, thereby in the figure covering only a part of the embroidery frame and illustrated by means of dashed lines to make the arrangement more illustrative. The embroidery frame 20 is attached to en embroidery unit controlled by the processor C, wherein said embroidery unit includes a first feeding means operated by a first step motor (not shown) for operating the embroidery frame in an x-direction. The embroidery frame 20 is in a corresponding manner attached to a second feeding means of the embroidery unit and correspondingly operated by a second step motor (not shown) operating the embroidery frame in a y-direction. By a control of the first and second step motors with signals from the processor C the embroidery frame 20, along with the housed stretched piece of fabric, may be steered to be displaced in an arbitrary direction in the xy-plane.

When conventional embroidery is performed in an embroidery machine of the discussed type the machine controls the movements of the embroidery frame fully according to stitch data stored in the memory M of the sewing machine according to all aspects concerning stitch types, sewing directions and so on according to prior art.

The algorithm enabling the different steps making it possible for a user to shape designs according to the objects of the invention is presented in the following illustrated by figures. Said algorithm is coded into computer language and functionalities added by said algorithms are accessible by the processor C of the sewing machine.

A group functionality is used in an embroidery mode available. The purpose is to provide a possibility to handle a number of any one of: patterns, pattern sequences, designs, embroidery characters or sew characters as one single unit. There are two different group types distinguished by the way they handle the positioning of the group items. Either the group items are positioned independently of each other or they are positioned according to a common algorithm. An explanation of the terms used in this document can be found at the end of the description.

A group contains a number of stitch data objects (SDO's). The group may consist of individually positioned SDO's or SDO's positioned according to an algorithm that controls the positioning of all the SDO's included in the group. The two different types of groups are thus identified as shown in Table 1 below.

TABLE 1

| Abbreviation | Description |
| --- | --- |
| GIP | A group that holds a number of SDO's. The SDO's are positioned individually. |
| GCP | A group that holds a number of SDO's. The SDO's are positioned according to a common algorithm (see further in the chapter titled: "GCP handling"). |

The GCP handles the individual SDO objects according to the chapter titled: GCP handling.

GCP Handling

GCP Definitions and Fundamental Algorithm

In this chapter the definitions and fundamental algorithms of GCP handling are described utilizing references to the enclosed drawings.

Figure 2:
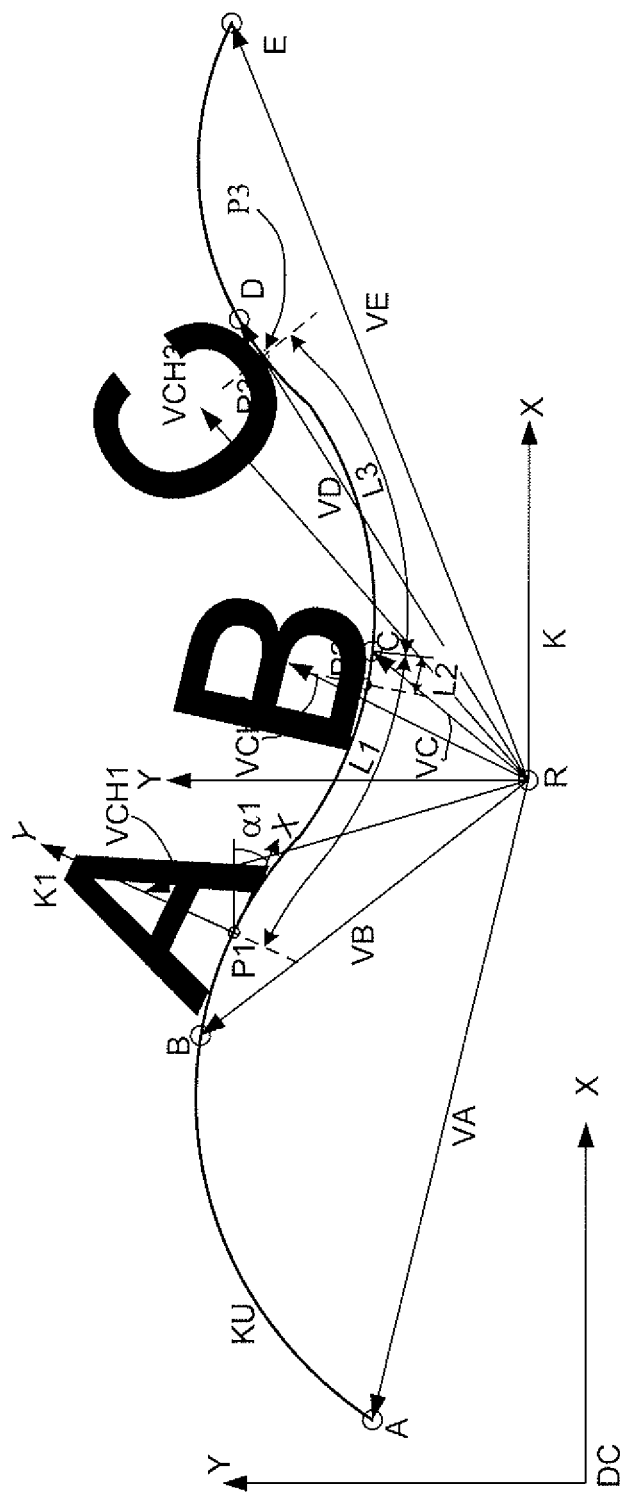
FIG. 2 shows a GCP represented by a number of SDOs, a number of curve definition points and a curve.

The GCP consists of a number of curve definition points, a curve and a number of SDOs. The curve KU, see further in FIG. 2, is controlled by a number of curve definition points A-E. An arbitrary number of curve definition points may be used, the number of curve definition points in FIG. 2 is only an example.

The position of the curve definition points is defined by the vectors VA, . . . , VE. The GCP uses the reference point R and the coordinate system K (origin R). The curve KU is defined by some mathematical algorithm, e.g. a NURB curve may be used to define the curve for the GCP. The curve shape is controlled by the curve definition points. The curve may pass through, or close to, the curve definition points, depending on which mathematical algorithm that is used.

Each SDO (exemplified by A, B, C in FIG. 2) is positioned on the curve KU. The SDOs are assumed to be inscribed in a rectangle. In the figure an SDO is positioned on the curve KU in such a way that at least one point (P1 to P3) of the circumference of the corresponding rectangle coincides with the curve KU. The positions P1, . . . , P3 are defined by the distance L1, . . . , L3 along the curve. The start point for L1, . . . L3 may vary depending on which positioning algorithm that is used. An angle between the side of the rectangle inscribing a corresponding SDO and the angle 0 in the coordinate system K is called α1 to α3 (only α1 is shown in the figure). The angles α1, . . . , α3 are thus specified by the slope of the curve KU in the points P1, . . . , P3. It should be added here that the angle in some special cases may be calculated in a different way, see further in the chapter titled: "SDO angle". An SDO position vector VCH1, . . . , VCH3 is calculated from the points P1, . . . , P3 and the corresponding angles α1, . . . , α3.

Figure 3:
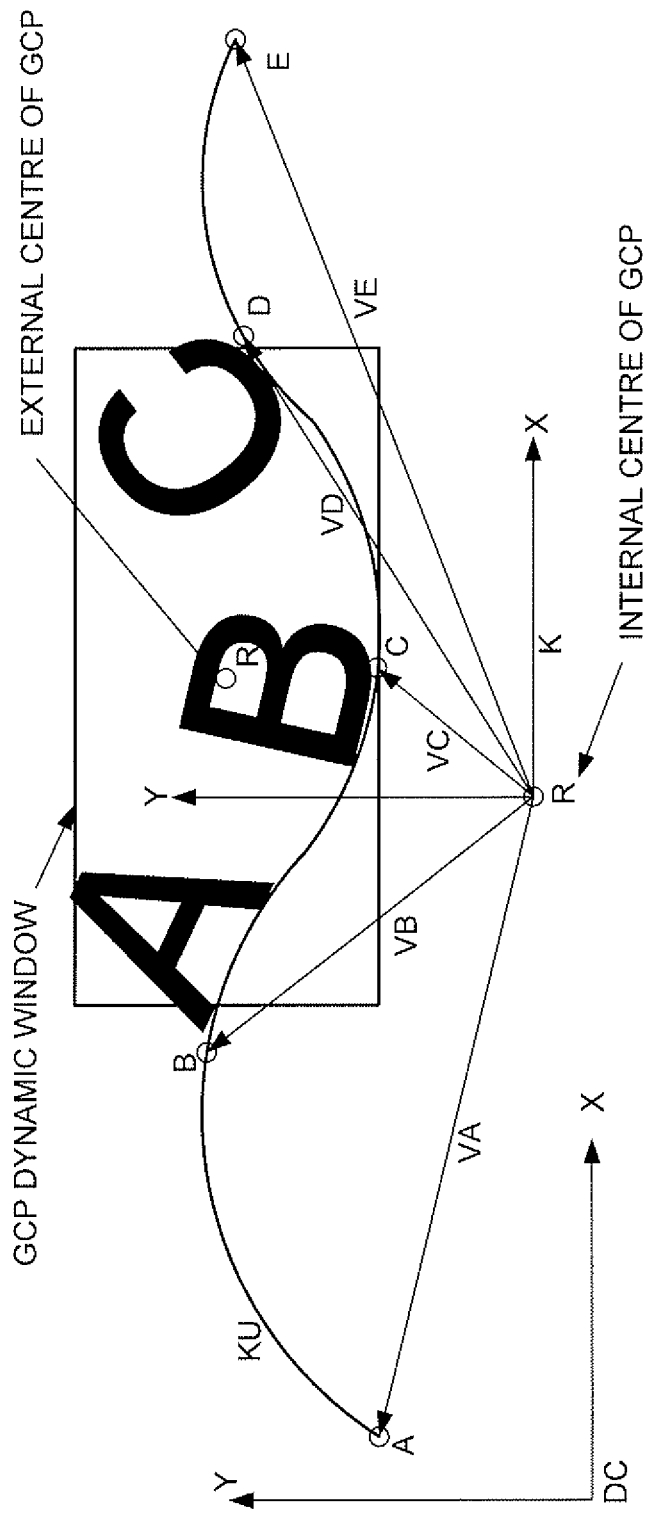
FIG. 3 shows the internal and external centres of the GCP of FIG. 2.

The GCP internal origin is the point R, see further in FIG. 3. However, the external centre of the GCP shall always be the centre point of the GCP dynamic window. This point, "external centre of GCP", shall be used as the reference point when the GCP is manipulated, e.g. positioned or rotated.

GCP Manipulation

Scaling [1]

Figure 4:
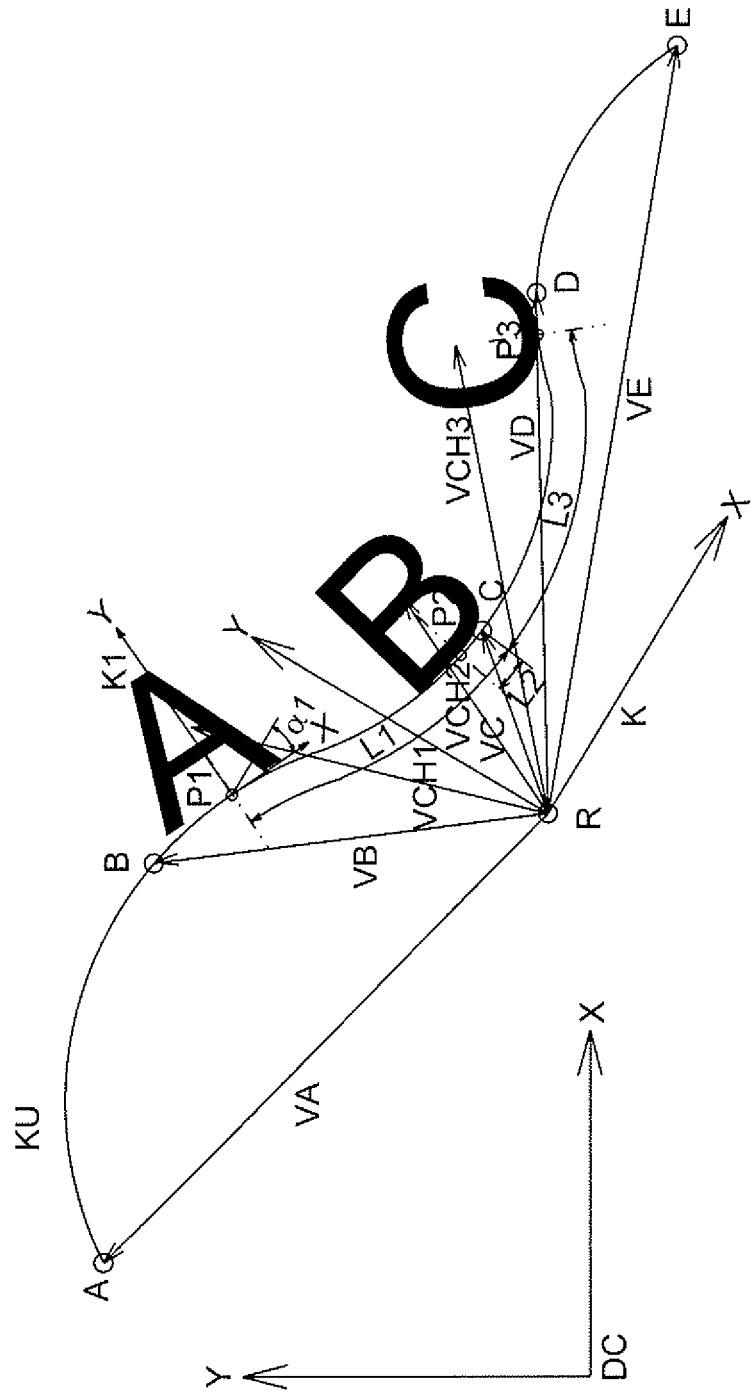
FIG. 4 shows a GCP before scaling.
Figure 5:
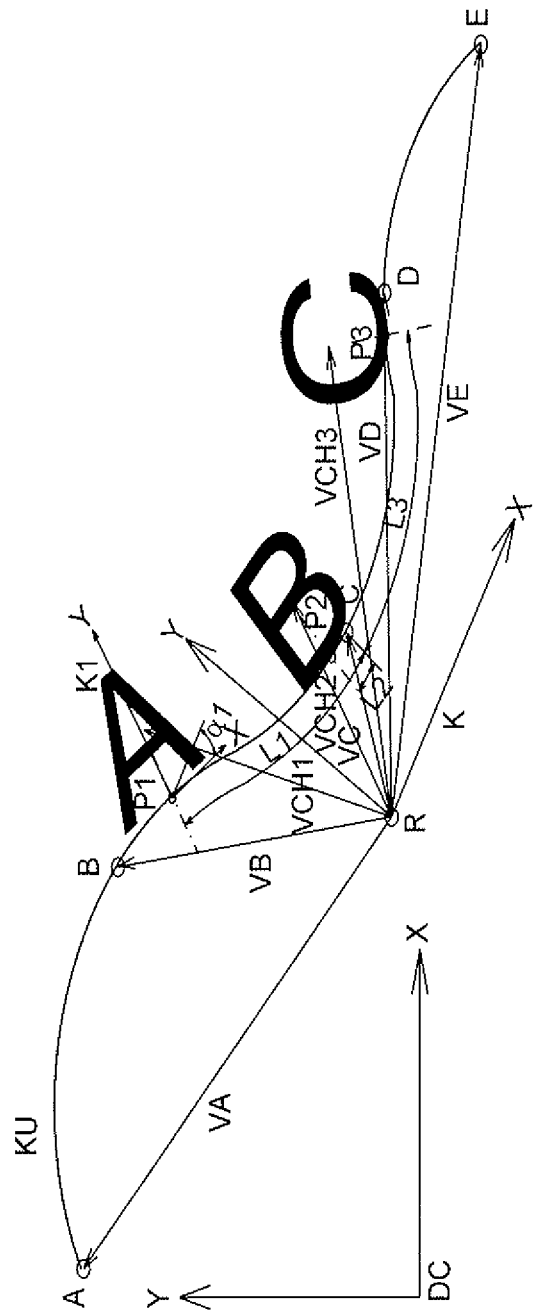
FIG. 5 shows the GCP of FIG. 4 after scaling.

Manipulation of GCPs includes e.g. scaling. Scaling is always performed along the axis in a global, fixed coordinate system DC, as indicated in the figures. FIG. 4 shows the GCPs (A, B, C described above) before scaling and FIG. 5 after scaling in the Y-dir.

Scaling procedure [2]

Steps:
1: The vectors VA, . . . , VE are scaled, see further in FIGS. 4 and 5.
2: The curve KU is calculated according to the changed curve definition points VA, . . . , VE.
3: Updated positions P1, . . . , P3 and angles α1, α3 are calculated according to the changed curve KU and possibly scaled L1, . . . , L3.
4: The SDO's are scaled. The new positions P1, . . . , P3 and angles α1, . . . , α3, together with the scale factor in x- and/or y-direction controls the influence of the scaling operation on each SDO. Note: The scaling of the SDO will affect the SDO position vector VCH1-VCH3.

Curve Modification [3]

A further GCP manipulation is a modification of the curve. Said modification procedure can be described by the steps:
1: The shape of the curve KU is modified by a change of the angle and/or the length of the curve definition point vectors VA, . . . , VE (coordinate system K).
2: The manipulated curve KU is calculated according to the changed curve definition points VA, . . . , VE.
3 The positions P1, . . . , P3 and the angles α1, . . . , α3 are calculated according to the manipulated curve KU. The distances L1, . . . , L3 are in some cases changed, in some cases not, depending on the positioning algorithm.

The curve may be modified freely by a change of the curve definition points. It is also desirable to use pre-defined shapes like straight lines and circles. Yet, the GCP internal positioning algorithm is always handled according to the scaling and modification as described. The different shapes are obtained by a change of the positions of the curve definition points.

Figure 22:
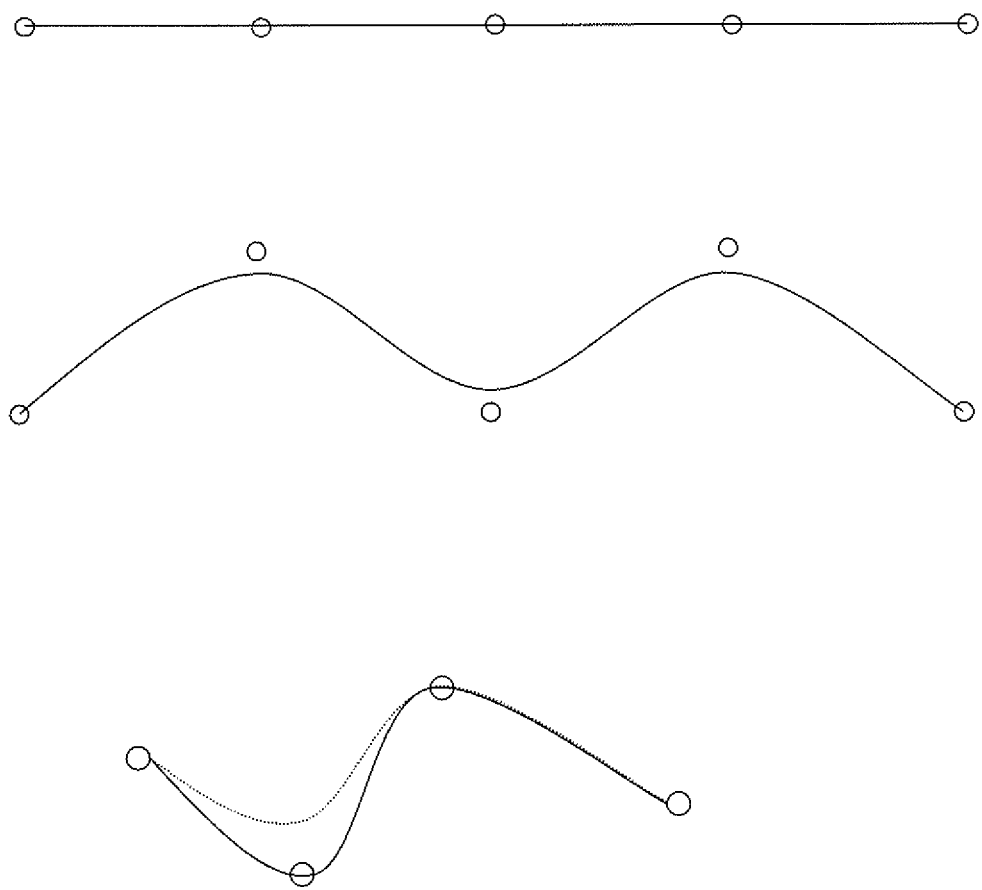
FIG. 22 shows curve modification by selecting a set of curve control points from the curve definition points followed by weighting.

FIG. 22 gives an example of how a curve may be modified by selecting a set of curve control points from the curve definition points. When the set of curve definition points is determined it is possible to modify the outline of the curve by a displacement of the curve control points. This is illustrated in FIG. 22, wherein in the uppermost example five curve definition points define a straight line. The second and the fourth points are selected as curve control points. When the selected curve control points are displaced according to the illustration in the middle of FIG. 22 the curve will adapt the shown shape. In the lowermost drawing of FIG. 22 it is illustrated how the "weight" of a curve definition point can change the shape of the curve when the weight is changed. After the change of the weight, the curve will, according to the example, adapt the shape shown by the dotted alternative.

File Storage [4]

When a GCP is saved to file, in a memory accessible by the processor of the sewing machine, the GCP attributes may be included in the file. This implies that it is possible to regenerate the GCP when the stitch data is loaded from file, and to keep the dependencies between the SDO's and the GCP.

Detailed Positioning Description

The detailed positioning is herein relating to positioning principles dealing with at least: characters, designs and patterns, pattern sequences and an intersection test.

Positioning of Characters (Embroidery and Sew) [5]

Figure 6:
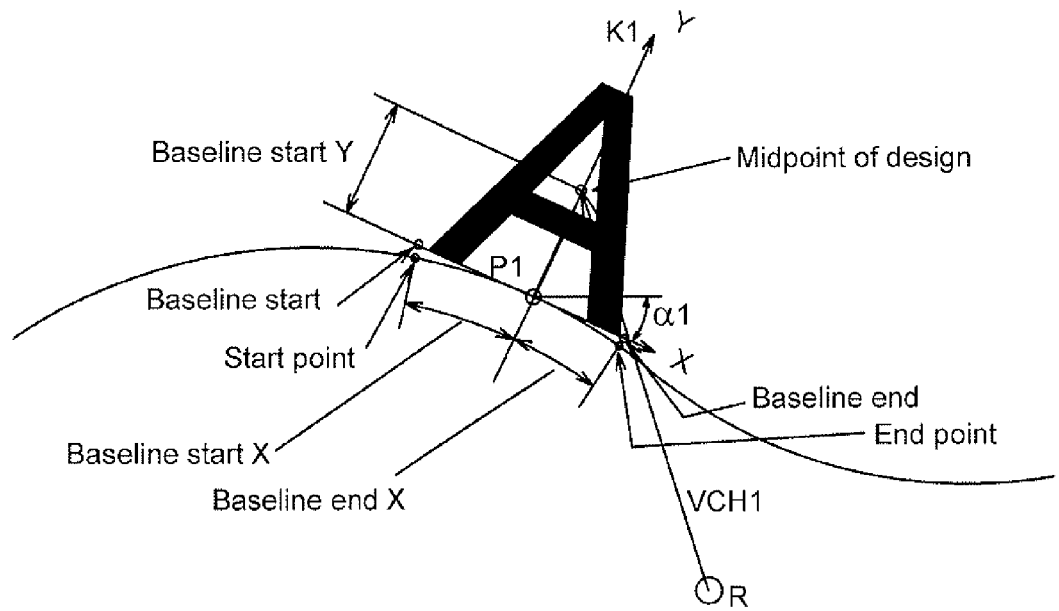
FIG. 6 describes details of character positioning rules.
Figure 7:
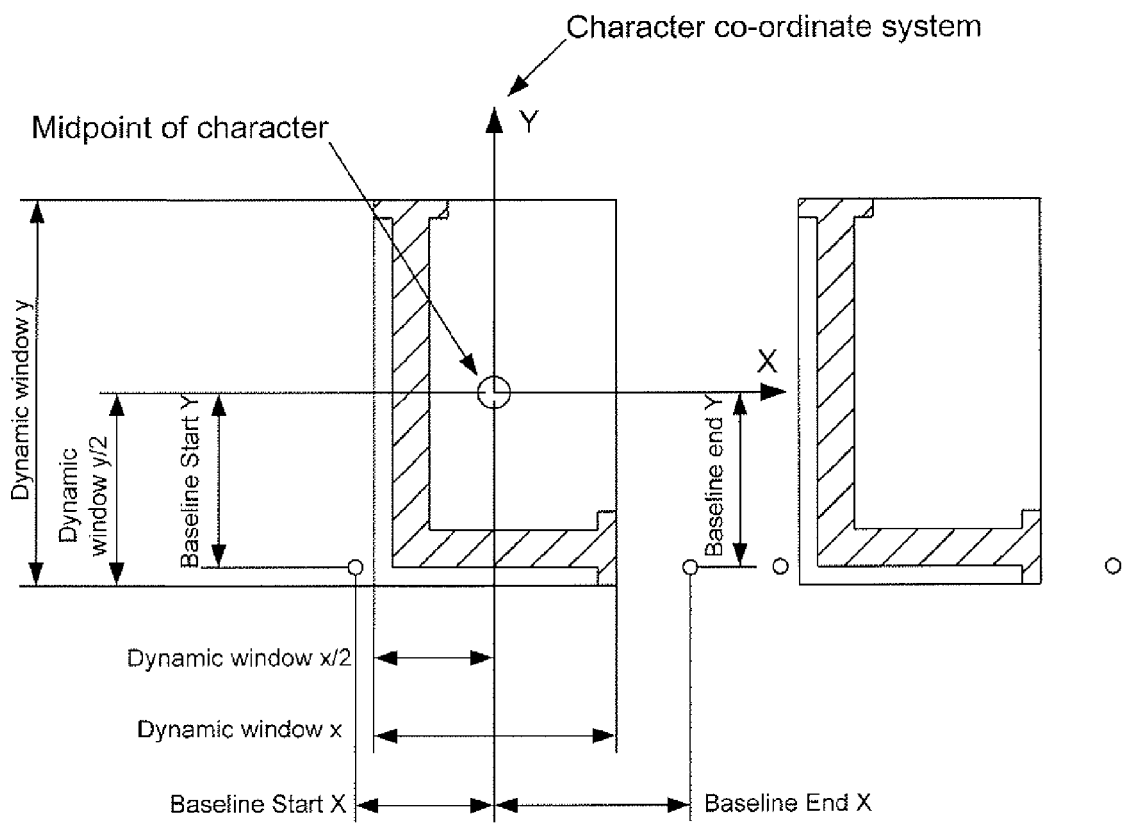
FIG. 7 describes character offsets.

FIG. 6 describes the detailed positioning rules that shall be used for positioning of characters. FIG. 7 describes the character offsets, i.e. how the baseline start and end points are related to the character. The baseline start and end points are used as reference points when the position of a character in a GCP is calculated. The start point of the SDO (in this case a character) shall be positioned at the end point of the previous SDO.

FIG. 7 shows a character and its baseline start and end points. The baseline start and end points for a character are positioned in such a way that appropriate distances to the character before and the character after respectively are big enough. This implies that the baseline start point of the character is positioned in the baseline end point of the previous character and the baseline start point of the subsequent character is positioned in the baseline end point of the character. FIG. 6 shows how the start- and end points for a character are calculated by projecting the baseline start- and end points, respectively, on the curve.

The start point of an SDO is often positioned in the end point of the previous SDO as described above. However, this is not always true. Other positioning strategies may be used, see further in Table 2. The positioning type 1 refers to the positioning strategy described above. Positioning type 2 is a similar positioning method but the distances between the SDOs are increased by an insertion of a gap between the start and end points. If positioning type 1 or 2 are used, the positions of the SDOs relative to the start and the end points of the curve may be changed. Three different examples of SDO positions are listed below:

A: The start point of the first SDO is set to the start point of the curve. After that the other SDOs are positioned according to positioning type 1 or 2. The SDOs are left adjusted.

B: The end point of the last SDO is set to the end point of the curve. After that the other SDOs are positioned according to positioning type 1 or 2. The SDOs are right adjusted.

C: The SDOs are centered, i.e. the distance from the start point of the curve to the start point of the first SDO is equal to the distance from the end point of the last SDO to the end point of the curve.

When positioning type 3 is used SDOs are distributed along the full length of the curve.

| | Positioning type |
|---|---|
| 1 | Position the SDO's start point in the previous SDO's end point. |
| 2 | As in 1 but a variable gap between the start point and the end point is inserted. |
| 3 | Automatically distribute the SDO's along the curve (the full curve length is used) |

Positioning of Designs and Patterns [6]

Figure 8:
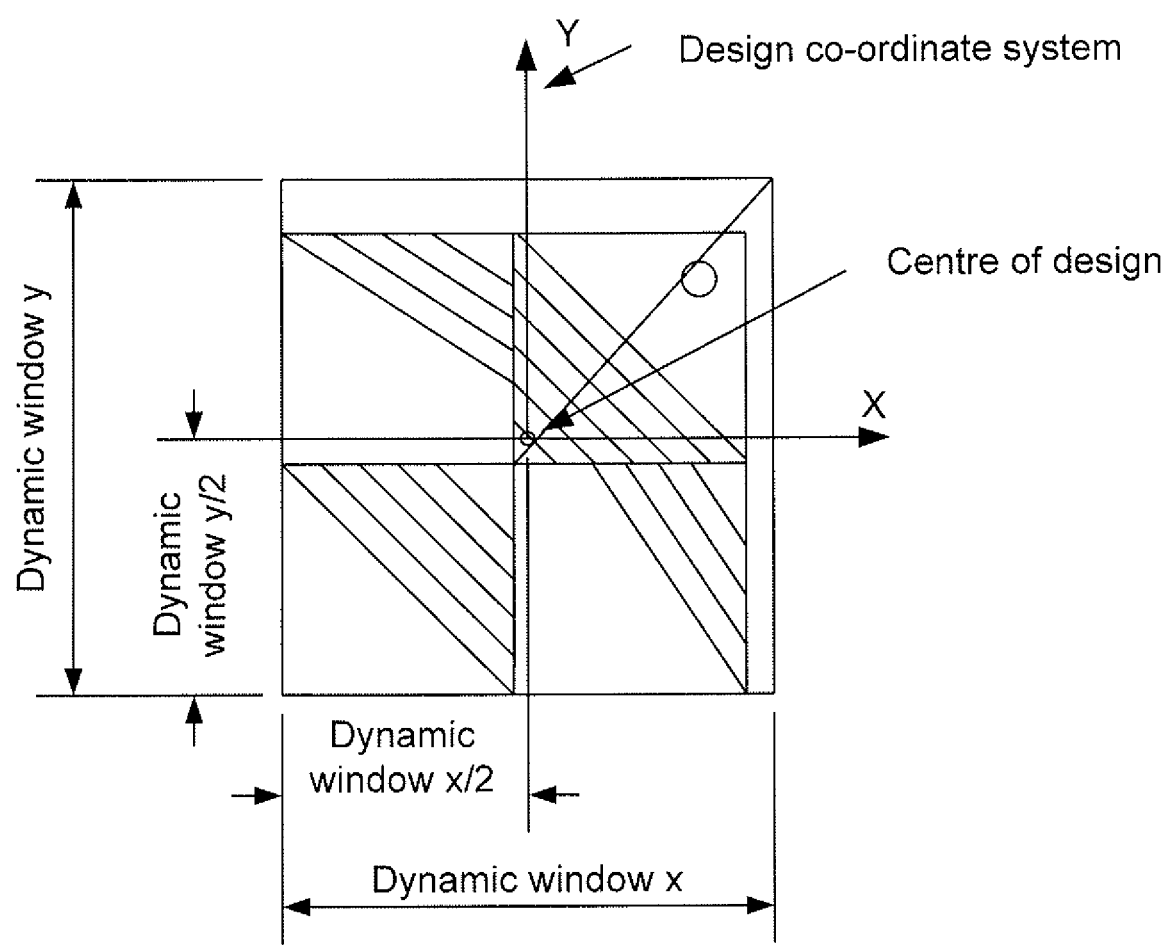
FIG. 8 illustrates the centre of the dynamic window for an SDO.
Figure 9:
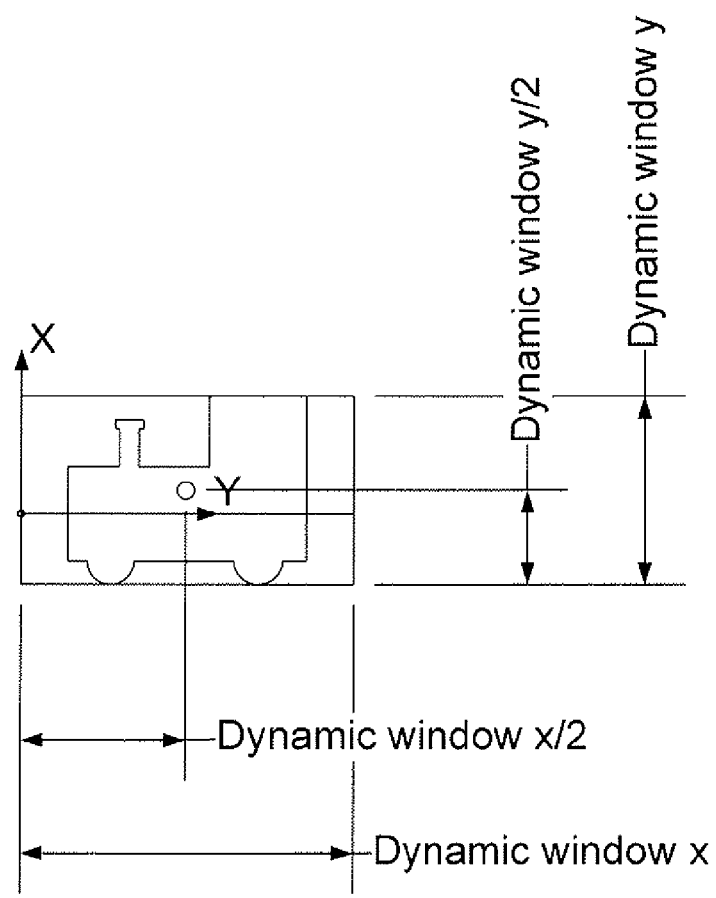
FIG. 9 illustrates the centre of a dynamic window for a pattern.
Figure 10:
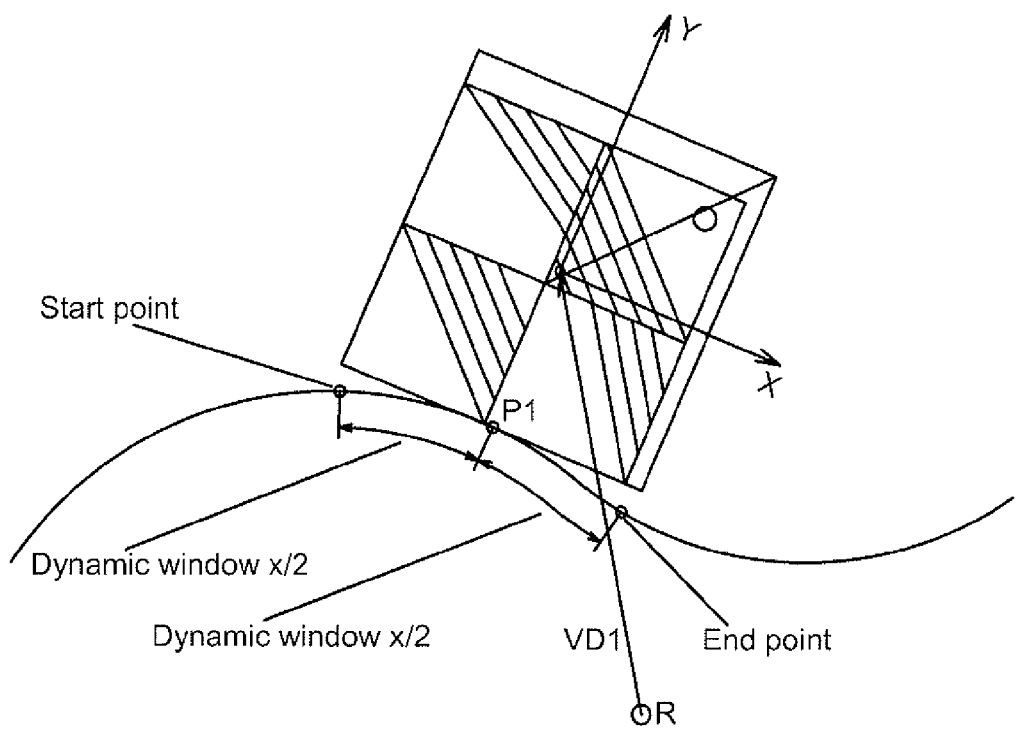
FIG. 10 illustrates how a design is positioned on the curve.

Designs and patterns use the dynamic window to calculate the start and end points. The dynamic window is defined as the enclosing rectangle, see further in FIGS. 8 and 9. The positioning window of designs and patterns is similar to positioning of characters described above. The only difference is how the SDO start and end points are calculated. Designs and patterns use the lower left and right corner respectively of the dynamic window instead of the baseline start and end points that are used for characters. FIG. 10 shows the start and end points for a design. The points have been calculated by projecting the lower left and right corners of the dynamic window onto the curve.

Positioning of Pattern Sequences [7]

Figure 11:
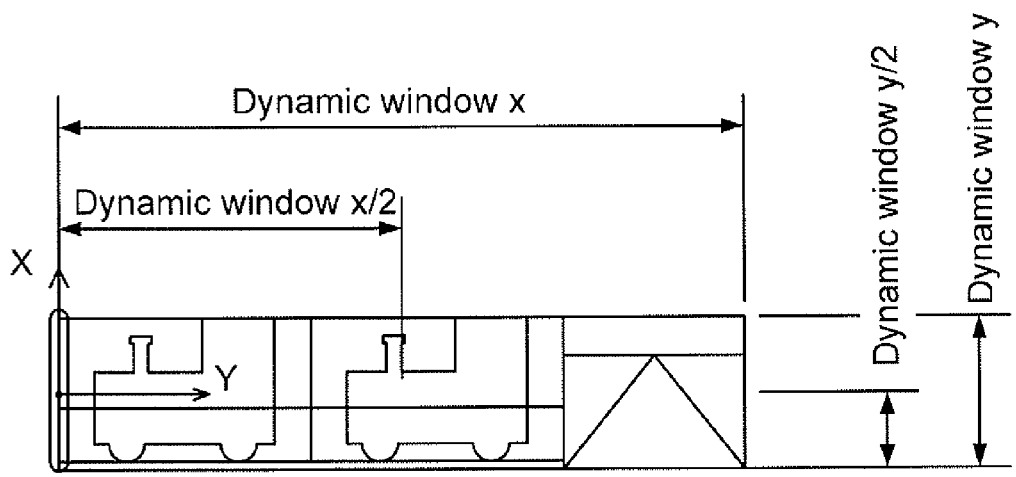
FIG. 11 shows a pattern sequence before it is split and distributed on the curve.
Figure 12:
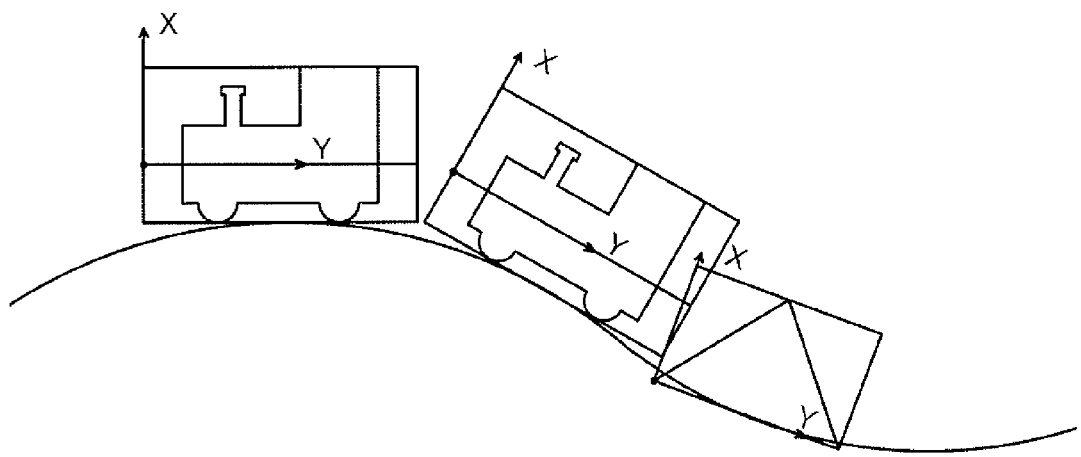
FIG. 12 shows a pattern sequence after it has been split and distributed on the curve.

A pattern sequence is normally treated as one single unit in an embroidery mode of the sewing machine. However, when a pattern sequence is inserted into a GCP, the pattern sequence shall be split, i.e. the separate patterns shall be positioned individually in the GCP. FIG. 11 shows a pattern sequence before it is split. FIG. 12 shows the split pattern sequence positioned in a GCP.

G Positioning Using Intersection Tests [8]

Figure 13:
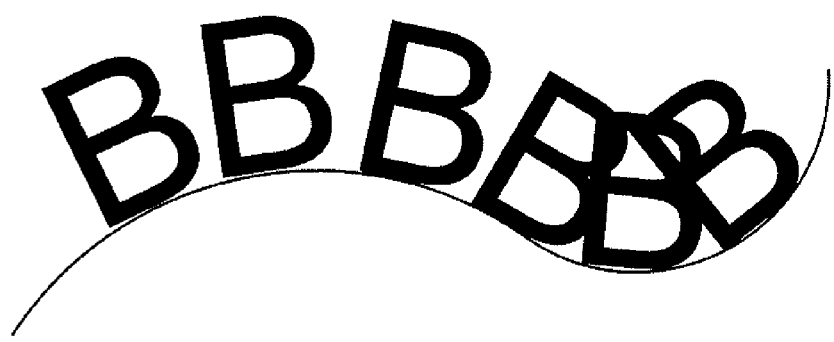
FIG. 13 shows a positioning which has resulted in an intersection of characters.

The positioning algorithms described above do not consider the intersection of SDOs. Depending on the curve shape and the extension of the SDOs the SDOs may or may not intersect. Thus, the SDO positioning algorithm may result in SDO overlap in some cases. This is illustrated in FIG. 13. The letters in the left part of the figure is positioned correctly but the letters to the right is overlapping each other. This is of course dependent on the convex respectively the concave form of the curve to the left respectively to the right. A simple algorithm to compensate for this is described in the present chapter.

Figure 14:
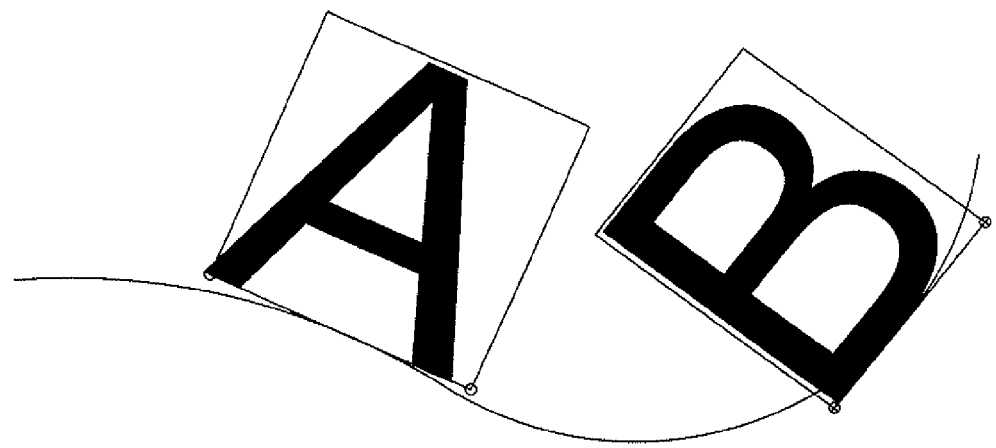
FIG. 14 shows a positioning window when SDOs are positioned (intersection check).
Figure 15:
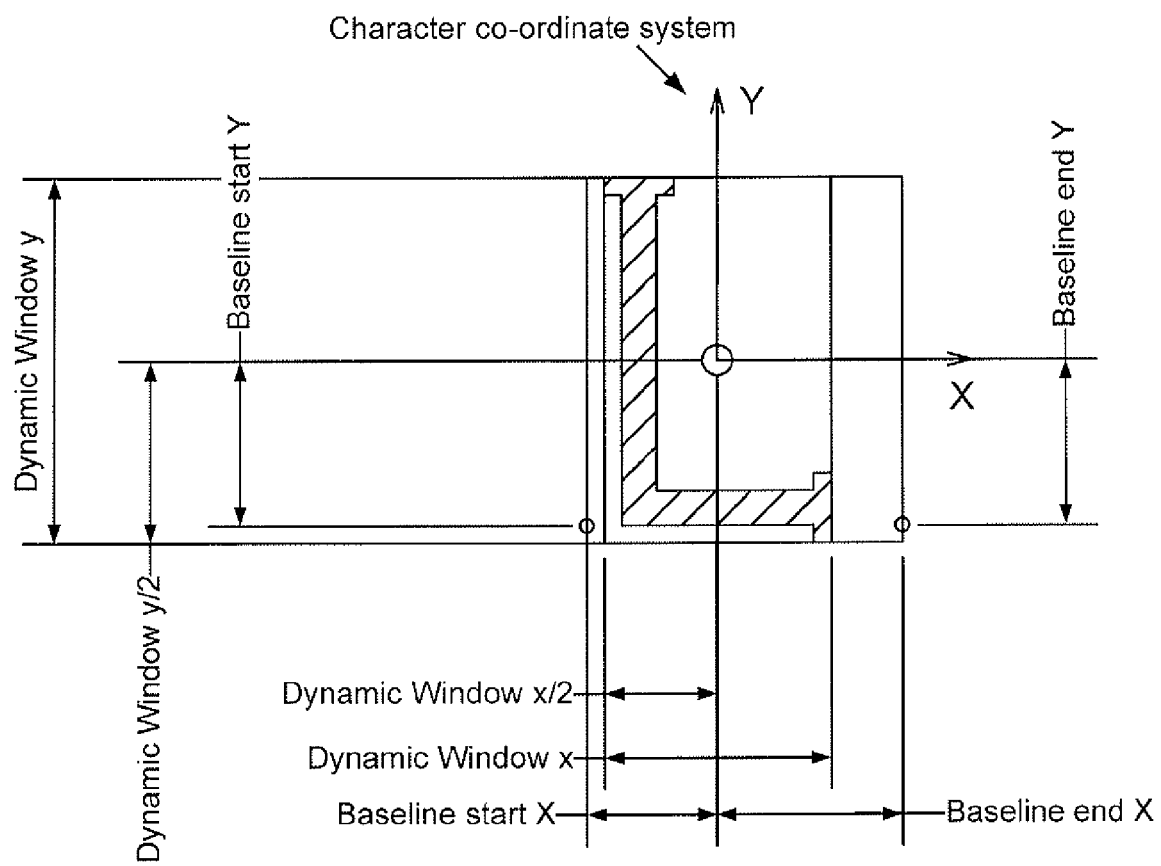
FIG. 15 shows the positioning window for a character (intersection check).

When a non-intersection flag, implemented on the sewing machine, is set, the algorithm below is used to prevent SDO intersection. FIG. 14 shows a "positioning window" (the positioning window corresponds to a rectangle enclosing the dynamic window and the baseline start and end points of a character, compare with FIG. 7) used when SDOs are positioned (non intersection flag set). The positioning window equals the dynamic window for designs and patterns. However, for characters, the positioning window is defined according to FIG. 15. The positioning window is always bigger than the dynamic window, and is defined by the dynamic window and the baseline points.

The steps below are performed when the SDO's are positioned. For each SDO:

1: The SDO position is calculated according to [5], [6], [7].
2: An intersection test is performed, i.e. it is tested if the positioning window of the current SDO intersects the positioning window of the previous SDO.
3a: If the positioning windows don't intersect, the calculated position is used, and the pos. algorithm is interrupted.
3b: If the positioning windows intersect:
   3b.1 The current character is moved along the curve to the next output point (output points are points used to draw the curve, i.e. herein defined as points that are interconnected by straight lines to create the curve).
   3b.2 The intersection test is performed again.
      3ba.1: If the positioning windows intersect, step 3b.1 is repeated.
      3bb.1: If the positioning windows don't intersect, the curve part from the previous output point to the next output point is divided into X intervals (e.g. X≈10) and the temporary points are saved.
      3bba.2: Move the character to the next temporary point. Check the window intersection for each temporary point.
      3bbaa.1 If the positioning windows don't intersect, keep the character position.
      3bbab.1 If the positioning windows intersect, repeat step 3bba.2.

SDO Angle

SDO Angle, General Offset. [9]

The SDO angle is normally defined by the slope of the curve KU, see further in the chapter: "GCP definitions and fundamental algorithm". However, an angle offset may be added. This angle offset is set for the GCP, i.e. the offset will have the same value for each SDO in the GCP. The angle offset is always added as the last step, after the positioning algorithms described in chapters "GCP definitions and fundamental algorithm" has been applied to the GCP.

SDO Angle, Curve Controlled [10]

Figure 16:
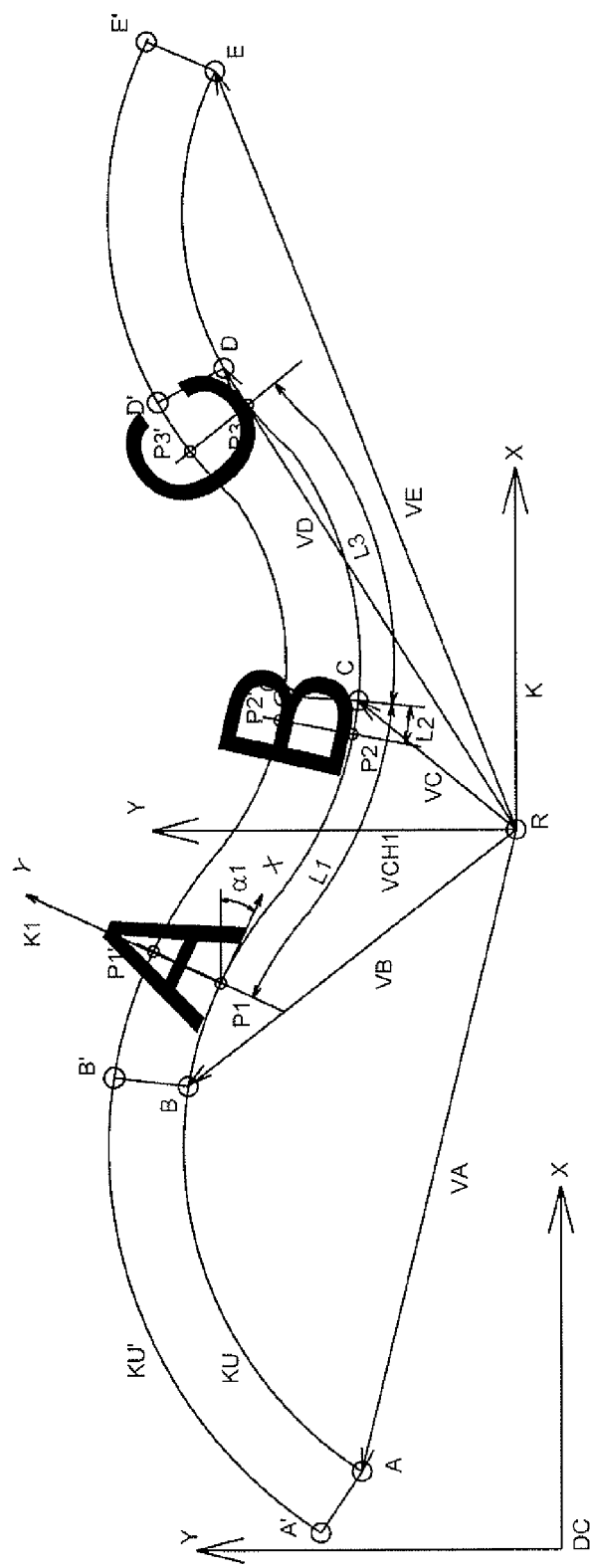
FIG. 16 describes the calculation of an angle of an SDO.
Figure 17:
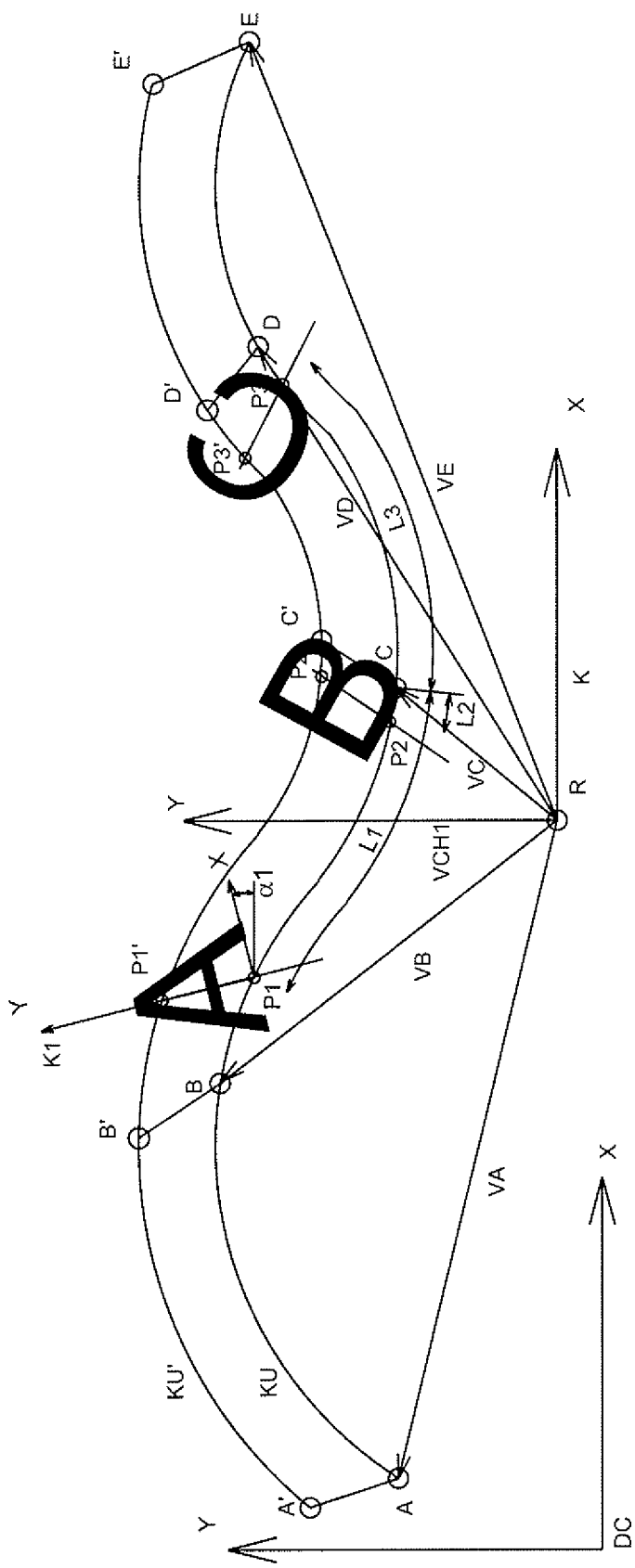
FIG. 17 describes the angles of the SDOs of FIG. 15 after moving curve definition points.

The SDO angle ($\alpha 1$, $\alpha 3$ in FIGS. 16 and 17) is generally calculated according to the chapter: "GCP definitions and fundamental algorithm", i.e. the angle is specified by the slope of the curve in point P1, ..., P3. FIG. 17 shows how the angle of the SDO's can be calculated. The angle for each SDO is defined by the line through P1-P1', P2-P2', .... The angles $\alpha 1$, ..., $\alpha 3$ are changed by moving the curve definition points A', ..., E' relative to the curve definition points A, ..., E, see further in FIG. 17.

Note: The curve KU' may also be used to control the scale of the SDO's.

Conversions

Conversion GIP to GCP [11]

A GIP may be converted to a GCP. The SDO's will be positioned according to the chosen GCP shape. The position and the angle of each SDO are always specified by the curve, i.e. the previous position and angle of the SDO's will not be maintained when the GIP->GCP conversion is done.

Conversion GCP to GIP [12]

A GCP may be converted to a GIP. The position vectors VCH1, ..., VCH3, see further in FIGS. 2 to 5, will be used to calculate the SDO position in the GIP. The curve KU and the curve definition points A, ..., E. will be deleted.

EXAMPLE

Figure 19:
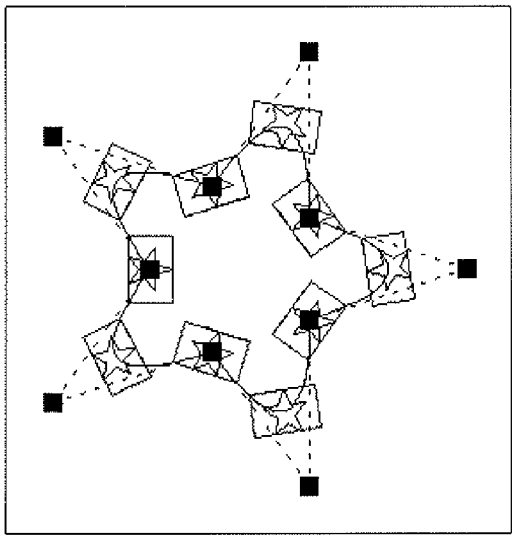
FIG. 19 shows the positions of the SDOs of FIG. 18, wherein the SDOs are controlled in relation to the curve definition points.
Figure 21:
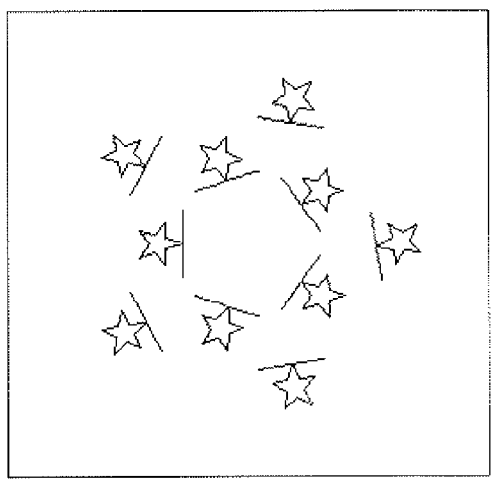
FIG. 21 illustrates the SDOs of FIG. 19 indication the improved positioning of the SDOs.
Figure 18:
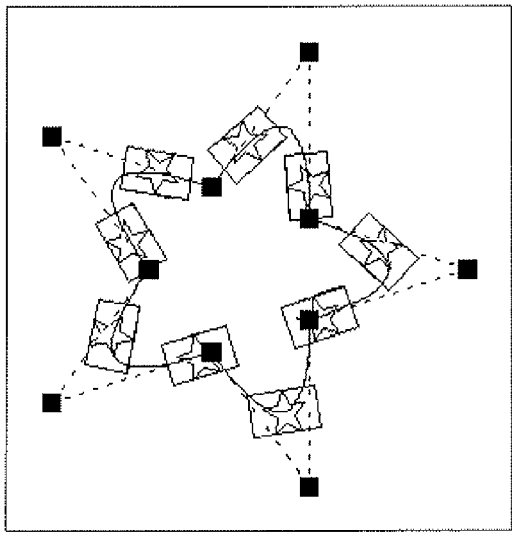
FIG. 18 shows a GCP wherein the SDOs are not controlled in relation to the curve definition points.
Figure 20:
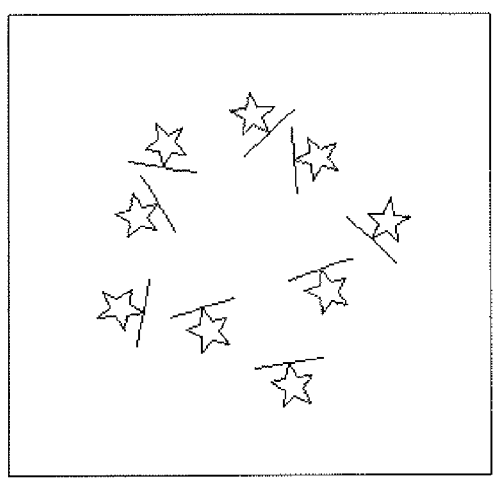
FIG. 20 illustrates the SDOs of FIG. 18 indicating the disorientation of the SDO positioning.

The SDOs are positioned along the curve with the aim of representing a certain shape, e.g. a star. Since the number of SDOs is normally relatively small compared to the number of curve points, the position of each SDO is very important if it shall be possible to recognize the shape when the curve is not shown. This is further illustrated in FIGS. 18 to 21. FIGS. 18 and 19 show a curve representing a star and a number of SDOs positioned along the curve. FIGS. 20 and 21 show the same GCP where only the SDOs are shown. The figures indicate how important it is to consider the position of the SDOs relative to the curve definition points.

Different positioning strategies have been developed, and if possible, the method being used, is aiming to position SDOs at the curve definition points that are defined as "sharp" (i.e. the points the shape's curve has to "pass through"). By applying this strategy, when possible, the resulting SDOs gives a much greater resemblance to the original shape, than just using the shape without this consideration.

The sharp-point positioning works in the following way;
A. Count the total number (sum1) of sharp points among the number of shape curve definition points (the curve definition points defining the start and end of the shape are considered to be "sharp"). This sum1 is N.
B. Calculate the number of shape "segments", which is defined as N-1. This defines the number of smaller segments that the shape can be divided into.
C. Count the total number (sum2) of SDOs to position along the shape. This sum2 is S.
D. If (N-1) is greater than 1 (i.e. the shape has at least 2 segments) and the quotient S/(N-1) is a whole number (i.e. S is a multiple of (N-1)) the sharp-point positioning is possible.
E. By treating each shape segment individually and positioning S/(N-1) SDOs at each shape segment it is possible to place the 1st SDO in such a selection exactly at the sharp curve definition point which defines the start of this segment. The rest of the SDOs in this selection are positioned as normal from this point and forward. The shape segment is populated with an automatically calculated gap, resulting in that the last SDO in one segment is placed with appropriate gap to the 1st SDO on the following shape segment.

Repeat step E for all shape segments, and the result will be that the SDOs are positioned on the fabric in a way that gives great resemblance to the original shape's form.

Definitions

An embroidery element is a stitch data object, abbreviated SDO, being at least one element of anyone from the group of: a pattern, a pattern sequence, a design, an embroidery character, a sew character.

Group is a group of embroidery elements.

The term shape is here used for a shaped group consisting of a group of selected embroidery elements with their positions controlled by a curve. The abbreviation GCP is used for the term shape.

Position is used as a term including the coordinates as well as the angle of an embroidery element in relation to a coordinate system.

A stitch is the relative movement between two needle points.

A needle point is a point where the needle has penetrated the fabric.

A pattern is an entity composed of a number of stitches. It is mainly used in sewing mode. However, it may also be used in embroidery mode (In embroidery mode the fabric is fed by means of an embroidery unit).

A pattern sequence is a number of patterns combined to form a sequence of patterns.

A design is an entity used only in embroidery mode. It is composed of a number of stitches and normally being the smallest entity possibly to edit.

An embroidery character is a variant of a design that describes a character used only in embroidery mode.

A sew character is a variant of a pattern that describes a character that may be used in embroidery or sewing mode.

The invention claimed is:

1. A method of positioning embroidery elements with a processor-controlled sewing machine, the method comprising:
   placing fabric that is to be embroidered in a position in relation to a threaded needle on the sewing machine;
   providing a plurality of embroidery elements defined as stitch data objects in a memory;
   selecting at least one of the plurality of embroidery elements to define a group of embroidery elements to be embroidered on the fabric;
   defining an arbitrary curve along which the embroidery elements shall be embroidered on the fabric;
   distributing the embroidery elements in a spaced relationship along the defined arbitrary curve utilizing a positioning algorithm; and
   preserving a coupling between the group of embroidery elements and the arbitrary curve.

2. The method according to claim 1, further comprising setting the arbitrary curve to be one of a number of predefined curves being accessible in the memory or a curve specified by a user of the sewing machine, wherein the arbitrary curve has a number of curve definition points.

3. The method according to claim 2, further comprising defining at least one set of control points for the group of embroidery elements, wherein each set of control points includes at least one of the curve definition points.

4. The method according to claim 2, further comprising modifying the arbitrary curve by at least one of translating, rotating, and scaling the set of control points.

5. The method according to claim 2, further comprising modifying the arbitrary curve by assigning a weight of at least one of the control points to determine a level of attraction by which the control point attracts the arbitrary curve.

6. The method according to claim 2, further comprising modifying the arbitrary curve by adding or removing a control point from the defined set of control points.

7. The method according to claim 2, further comprising modifying the arbitrary curve by adding or removing a curve definition point from the arbitrary curve.

8. The method according to claim 1, further comprising setting a gap between the embroidery elements of the group of embroidery elements as an evenly distributed gap or a user specified gap distribution.

9. The method according to claim 1, further comprising setting an angle between an embroidery element of the group of embroidery elements and a tangent of the curve at a point of the curve to which the embroidery element is assigned by any one of use of an angle set by a positioning algorithm, use of a manual set of the angle, use of an angle aligned to a specific coordinate system, or use of a specific angle control algorithm.

10. The method according to claim 1, further comprising selectively adjusting the position of at least one of the embroidery elements in relation to at least one of a neighboring embroidery element of the group of embroidery elements, and the arbitrary curve.

11. The method according to any one of the preceding claims, further comprising defining a point related to the geometry of the embroidery element, wherein the point is one of a point on a side of a rectangle inscribing the embroidery element, a point on a symmetry line of the graphic object represented by the embroidery element, a midpoint of the symmetry line, a sharp point of the graphic object represented by the embroidery element, a point selected by the user, or aligning the embroidery element to the curve by means of positioning the point on the curve.

12. The method according to claim 1, further comprising storing a version of the group of embroidery elements edited on the sewing machine in a memory for later use.

13. The method according to claim 1, further comprising automatically adjusting the positions of the embroidery elements in a predetermined relation to sharp points of the arbitrary curve.

14. The method according to claim 1, further comprising automatically positioning the positions of the embroidery elements to compensate for convex and concave portions of the arbitrary curve along which the embroidery elements are positioned.

15. A method of positioning embroidery elements with a processor-controlled sewing machine, the method comprising:
    placing fabric that is to be embroidered in a position in relation to a threaded needle on the sewing machine;
    selecting a group of embroidery elements to be embroidered on the fabric;
    distributing the group of embroidery elements along an arbitrary curve;
    performing an intersection test on at least one embroidery element from the group of embroidery elements distributed along the arbitrary curve to determine if the at least one embroidery element overlaps any of the other embroidery elements from the group of embroidery elements distributed along the arbitrary curve; and
    positioning the at least one embroidery element on the arbitrary curve in response to feedback received from the intersection test such that it does not overlap any of the other embroidery elements from the group of embroidery elements distributed along the arbitrary curve.

* * * * *

UNITED STATES PATENT AND TRADEMARK OFFICE
CERTIFICATE OF CORRECTION

PATENT NO. : 8,683,932 B2  Page 1 of 1
APPLICATION NO. : 12/675518
DATED : April 1, 2014
INVENTOR(S) : Eklund et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this
Twenty-ninth Day of September, 2015

Michelle K. Lee
*Director of the United States Patent and Trademark Office*